DIRECT CURRENT AMPLIFIER

Filed April 8, 1946 3 Sheets-Sheet 1

Inventor:
Roswell W. Gilbert,
By
Pierce & Scheffler,
Attorneys.

Inventor:
Roswell W. Gilbert,

By Pierce & Scheffler,
Attorneys.

DIRECT CURRENT AMPLIFIER

Filed April 8, 1946

3 Sheets-Sheet 3

Inventor:

Roswell W. Gilbert,

By Pierce & Scheffler,

Attorneys.

Patented May 1, 1951

2,550,990

UNITED STATES PATENT OFFICE 2,550,990

DIRECT CURRENT AMPLIFIER

Roswell W. Gilbert, Montclair, N. J., assignor to Weston Electrical Instrument Corporation, Newark, N. J., a corporation of New Jersey Application April 8, 1946, Serial No. 660,582

2 Claims. (Cl. 179—171)

This invention relates to direct current amplifiers of the electronic tube type and more particularly to amplifiers for use in electronic service test instruments having high impedance direct current voltage ranges.

Such direct current amplifiers are commonly termed "instrument amplifiers" and they differ from amplifiers employed in radio and television apparatus in that the gain of the amplifier is of secondary importance as the primary objectives are zero stability, calibration permanence and linearity. It is of course desirable to operate the apparatus from the available light and power circuits, usually 110–125 volts, 60 cycles per second, and it has been common practice to employ a maximum amount of degeneration to reduce the fluctuation of amplifier gain with varying line voltage. In general, prior instrument amplifiers represent methods of combining a high degree of inherent gain which in turn allows a correspondingly high degree of degeneration for stability. The stability of the prior instrument amplifiers has been improved by "matching the tubes" either through a selection of tubes having comparable operating characteristics or through the adjustment of the values of circuit elements to compensate for differences in operating characteristics, and by regulating the plate supply voltage, but these refinements are admittedly made necessary by the residual instability of the amplifier proper, and would not be required if the amplifier itself were stable.

Objects of the present invention are to provide direct current instrument amplifiers that are characterized by a much higher accuracy and stability of calibration than has been possible in the past; and that are substantially as economical, in terms of the number of tubes and other circuit elements, and of manufacturing adjustments, as the prior equipment of relatively uncertain stability. An object is to provide direct current amplifiers of the degenerated type in which regeneration is employed to obtain a substantially infinite gain through a portion of the circuit so that degeneration will be fully effective. Objects of the invention are to provide direct current amplifiers including a pair of vacuum tubes which each have a primary and a secondary control electrode, conductive circuit elements connecting the secondary control electrode of each tube to the anode of the other tube for establishing a desired degree of regeneration, conductive circuit elements connecting the anode of each tube to its own primary control electrode to provide degeneration, circuit connections for impressing an input signal upon the primary control electrodes, and an output circuit conductively connected between the anodes of the tubes. An object is to provide instrument amplifiers that may be termed "plate follower circuits" by analogy to the designation of certain prior instrument amplifiers as "cathode follower circuits."

These and other objects and advantages of the invention will be apparent from the following specification when taken with the accompanying drawings in which.

Figure 1:
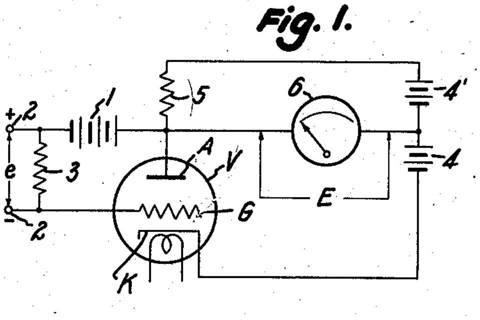
Fig. 1 is a schematic diagram of the basic "plate follower" amplifier.
Figure 2:
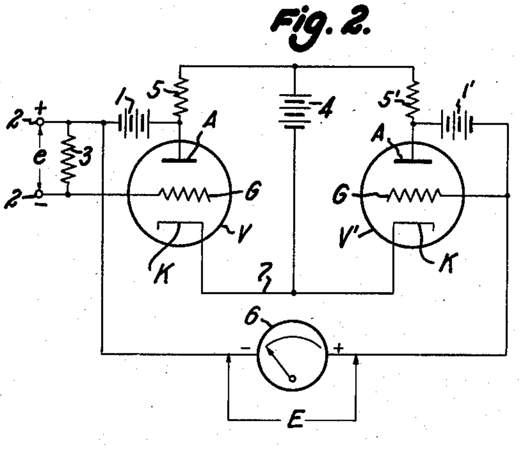
Fig. 2 is a schematic diagram of a bridge circuit modification in which a second tube is employed as a reference voltage point.

The novel circuit arrangements and the method of operation may be best understood by first considering the schematic diagrams, Figs. 1 and 2, which illustrate the basic circuit and a bridge circuit of the plate follower type of amplifiers. In the Fig. 1 circuit, the plate of the vacuum tube V is connected to the grid G through a coupling battery 1 and an input voltage circuit that is indicated schematically as a voltage input $e$ across input terminals 2, 2, the shunt input circuit resistor 3 (which may be of the order of megohms) being connected across the terminals. A current source such as indicated as batteries 4, 4′ is connected between the tube cathode K and plate A through a plate load resistor 5, and a voltmeter 6 is effectively connected across the plate load 5 to indicate the output voltage E developed by an input voltage $e$. With no input voltage $e$, the circuit will adjust itself to that point on the grid voltage-plate voltage characteristic at which the algebraic sum of the grid and plate voltages equals the voltage of the coupling battery 1. The instrument 6 indicates zero output under this assumed zero input as the voltages of batteries 4, 4' are adjusted to balance out the normal plate voltage. When an input voltage $e$ is injected, the grid voltage changes by an amount equal to the input voltage $e$ less the output voltage E, and the circuit rebalances at:

$$\frac{E}{e-E}=\mu$$

where $\mu$ is the voltage ratio or amplification factor of the tube. This condition exists only if the load resistance, including the output voltmeter 6, is infinite. Otherwise the power factor is the loaded circuit gain, or the product of the tube transconductacne $G_m$ and the total variational plate circuit resistance $R_p$ including the output load, and the rebalance then becomes:

$$\frac{E}{e-E}=G_mR_p \qquad (1)$$

Converting to express the balance condition as a voltage gain ratio:

$$\text{Gain}=\frac{E}{e}=\frac{G_mR_p}{G_mR_p+1} \qquad (2)$$

It is to be noted that the gain is always less than unity and approaches that value as $G_mR_p$ becomes larger.

When an input voltage $e$ is injected, the actual control grid voltage excursion is only $e-E$, thus allowing relatively large input voltage variations without introducing a prohibitive degree of non-linearity. This action is similar in end result to that of the "cathode follower" type of instrument amplifier circuit, but it is obtained without the use of degenerative cathode resistance. Assuming a steady level of input voltage $e$, the illustrated circuit is stable because the grid-plate coupling is such that the grid potential is forced to follow the plate potential upon variations in the plate potential. The Fig. 1 type of circuit may therefore be termed a "plate follower" circuit to distinguish it from the prior "cathode follower" type of degenerative instrument amplifier circuit.

The Fig. 1 circuit is of interest for the purpose of explaining the method of operation of the plate follower circuit, and it has a limited field of use in measurement work where high accuracy is not essential or where other equipment is available for checking the calibration of the apparatus. The zero drift of the amplifier and of the voltmeter calibration may be prevented through the use of a bridge type variation, as illustrated in Fig. 2, in which a second tube V' provides a voltage reference point. The tube cathodes K are connected by a jumper or lead 7, and a common current source 4 energizes the plate circuits through load resistors 5, 5'. The input circuit of tube V is the same as in the Fig. 1 circuit, and a biasing battery 1' is connected between the control grid and plate of the tube V'. The output circuit of instrument 6 is connected across the grid ends of the bias batteries 1, 1' which are the most stable circuit points with respect to the directly connected cathodes. As no cathode degenerating resistors are used the circuit takes full advantage of the bridge type of connection and the maximum possible zero stability is obtained.

It is usually desirable to employ pentode tubes in place of the schematically illustrated triodes V, V' as the overall gain ratio increases with the total variational plate circuit resistance. The absence of cathode resistance permits the introduction of these additional tube elements without involving their functions with the degenerative function of the control grids. In the two tube circuit of Fig. 3, this feature of functional independence of the control grids $G_1$ and the second grids $G_2$ of the amplifier tube V and the reference tube V' has the additional advantage that regeneration may be introduced to increase the effective mutual conductance of the tubes. The plate A of each tube is connected to the second grid $G_2$ of the other tube by leads 8, and the plates of the tubes are connected through an adjustable resistor 9 which provides a control of the regeneration. The plate supply 4 is connected to the plate resistors 5, 5' through a tapped resistor or potentiometer 10 which is adjusted to balance the operating characteristics of the two tubes.

Reactive coupling of tube elements in alternating current amplifying systems for purposes of regeneration, degeneration, or both, are well known in the art. It is to be noted the Fig. 3 embodiment of the invention accomplishes both regeneration and degeneration through the medium of conductive coupling thereby permitting operation of the system on direct currents as well as alternating currents.

Figure 3:
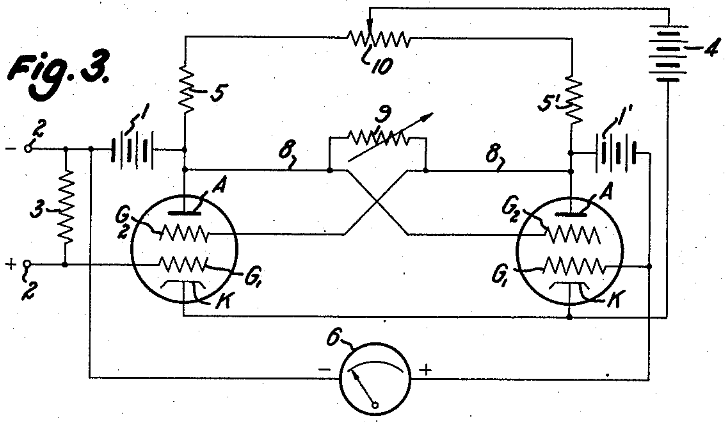
Fig. 3 is a circuit diagram of compound feedback amplifier that has a gain of unity when the regeneration is critically adjusted to obtain substantially infinite gain through the amplifier tubes.

As in the previous circuit diagrams, only the essential tube elements are illustrated in Fig. 3. The second grids $G_2$ are most conveniently the screen grids of standard pentode tubes as these elements are designed to operate at voltages comparable to the plate voltage without secondary emission complications.

A number of unusual and unexpected operating characteristics are imparted to the Fig. 3 circuit through the introduction of regeneration into a degenerative amplifier circuit. Although Equation 2 indicates that the gain of a degenerative instrument amplifier may approach but never reach unity, the gain of the Fig. 3 circuit may be increased to and even beyond the seemingly impossible value of unity. If the control grids $G_1$ are temporarily made ineffective, for example by disconnecting them from the bias batteries 1, 1' and biasing from separate sources, and the regeneration control increased by adjustment of resistor 9, a point of instability will be reached where the circuit will fall over, one tube blocking and the other conducting in the manner of a half-cycle of a multivibrator operation. At this point, the circuit is critically regenerated and is essentially an amplifier of infinite gain. All tendency towards instability is eliminated upon reconnecting the control grids $G_1$ to the degenerative coupling batteries 1, 1', and the circuit has the operating characteristic which would obtain with a tube V of infinite mutual conductance in the Fig. 1 circuit. Furthermore, the regeneration may be increased substantially without giving rise to instability, and this is of considerable practical importance as it provides a considerable latitude between the point of optimum adjustment and the region of instability. In fact, unless the resistance of the output voltmeter is quite low, the regenerative control resistor 9 may be removed without causing instability when standard type pentode tubes are used.

Another interesting property of the Fig. 3 circuit when critically regenerated is that it behaves as an output voltage source of zero variational resistance within functional limits. In operation with an input voltage applied, the output voltmeter may be shunted to draw more output current without affecting the voltmeter reading.

Conversely, series resistance may be added to the coupling battery circuits without affecting the output reading. In either case, the plate-grid regenerative action supplies the additional output energy without requiring any change in the control grid potentials, and therefore the overall voltage ratio remains constant. Under-regeneration causes a positive variational resistance and over-regeneration causes a negative variational resistance. In the latter case, shunting the output voltmeter will result in an increase in the voltmeter reading. The circuit may be readily adjusted for critical regeneration and thereby for unity amplification by shunting the voltmeter 6 and adjusting the regeneration control resistor 9 to that value at which the voltmeter reading does not change when the shunt is applied and/or removed.

Figure 4:
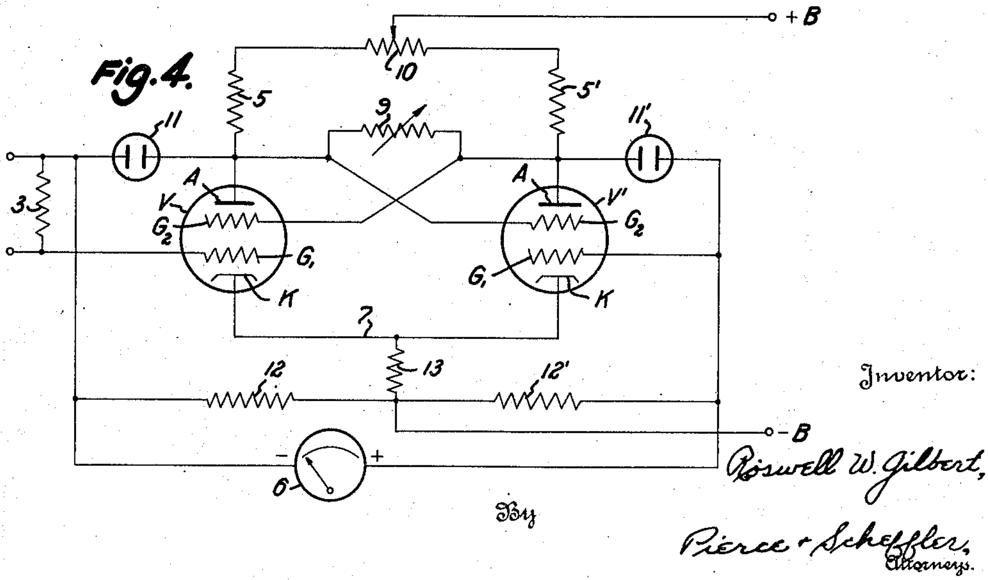
Fig. 4 is a circuit diagram of a commercial amplifier that is basically the same as the Fig. 2 circuit, but designed for operation from a power line, the amplifier being of the voltage input-voltage output type.

A circuit for operation from the usual light and power circuits, and a rectifier (not shown), is illustrated in Fig. 4. The bias batteries of the previously described circuits are replaced by small gas voltage regulator tubes 11, 11' respectively, i. e. by small neon tubes which, in one embodiment were designed to carry an operating current of about 500 microamperes and had a variational resistance of approximately 4000 ohms. The regulator tubes 11, 11' are returned to the cathodes through individual resistors 12, 12' respectively of about 200,000 ohms and a common cathode resistor 13 of about 20,000 ohms. The lead 14 from the positive terminal +B of the plate supply of 300 volts is connected to the tap of the zero adjusting resistor 10 of 5,000 ohms, and the negative terminal −B is connected to the outer terminal of the cathode resistor 13. Except as described above, the elements of the Fig. 4 circuit are or may be identical with elements of Fig. 3 and are identified by the same reference numerals. The tubes V, V' were of the 6SJ7 type, the plate load resistors 5, 5' were 50,000 ohms each, and the input shunt resistor 3 was of a high value of the order of up to 10 megohms. The output voltmeter 6 had a range of 0–3 volts and a resistance of about 10,000 ohms per volt. These recited values of the various components of an embodiment of the Fig. 4 circuit are indicative of good circuit design but it is to be understood that the invention is not limited to these or to any other set of circuit constants.

Figure 5:
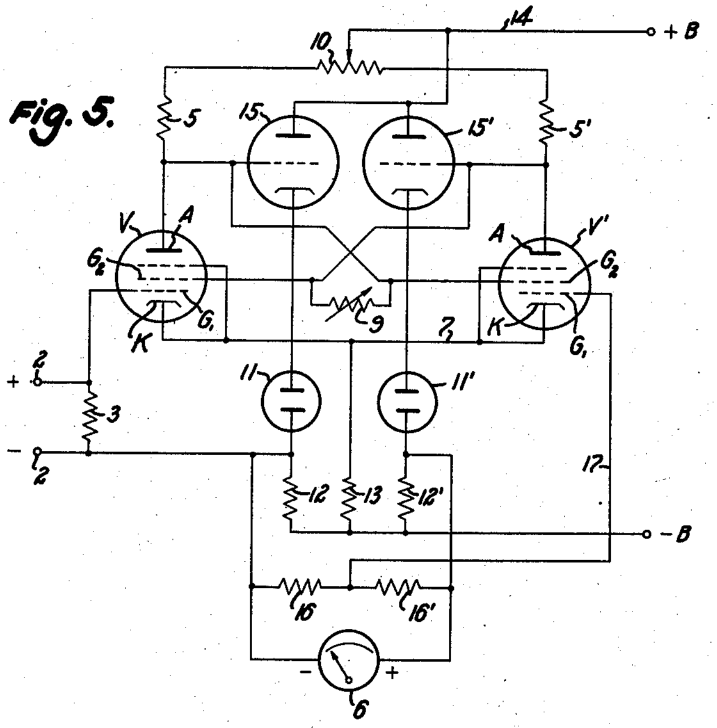
Fig. 5 is a diagram of another voltage input-voltage output amplifier which has a gain of more than unity.

The circuit of Fig. 5 is essentially the Fig. 4 circuit as embodied in a practical apparatus for laboratory and general use. The input tube V and reference tube V' are each followed by a buffer stage of the cathode follower type which function to remove the output load and the regulator tube current from the regenerative portion of the circuit. The control grids of the buffer stage tubes 15, 15' are connected to the anodes of tubes V, V' respectively, and the cathodes of the tubes 15, 15' are returned to the control grids G of the tubes V, V' through the cold cathode gas voltage regulator tubes 11, 11' respectively. The plates of the buffer stage tubes are connected to the lead 14 from the plate supply terminal +B. Without the buffer action of the tubes 15, 15', it might prove impossible to develop the desired output without loading the tubes V, V' to the point where critical regeneration is not obtainable.

The circuit also differs from the Fig. 4 embodiment in that the output voltmeter is connected across those terminals of the regulator tubes 11, 11' which are returned to the control grids of the tubes V, V', and is shunted by serially connected resistances 16, 16'; the junction of said resistances being connected by a lead 17 to the control grid $G_1$ of the tube V'. Except for these specifically described differences, the elements of the Fig. 5 circuit are or may be identical with corresponding elements of the Fig. 4 circuit.

Figure 6:
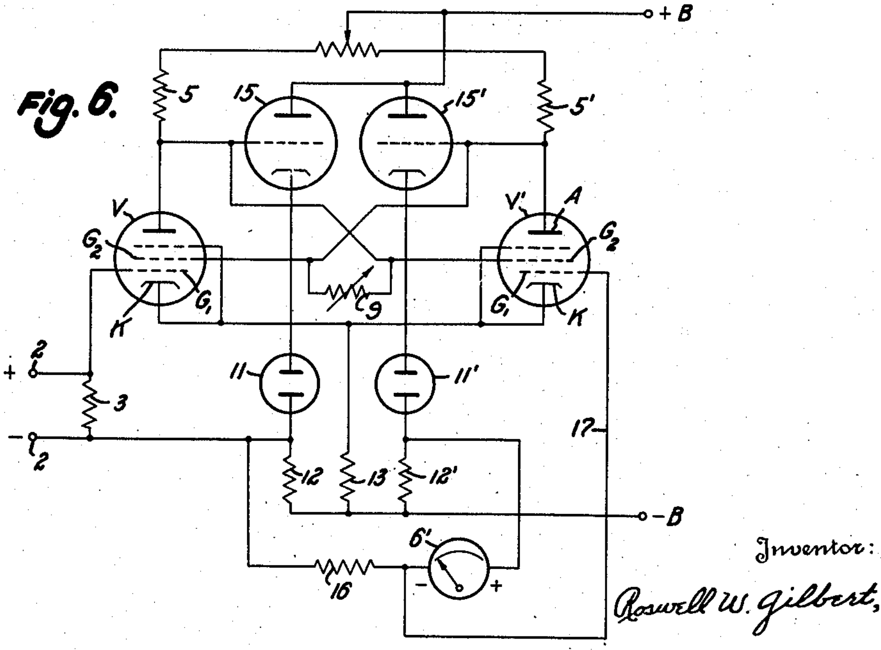
Figs. 6, 7 and 8 are diagrams of amplifiers of the voltage input-current output, current input-voltage output and current input-current output types, respectively.
Figure 7:
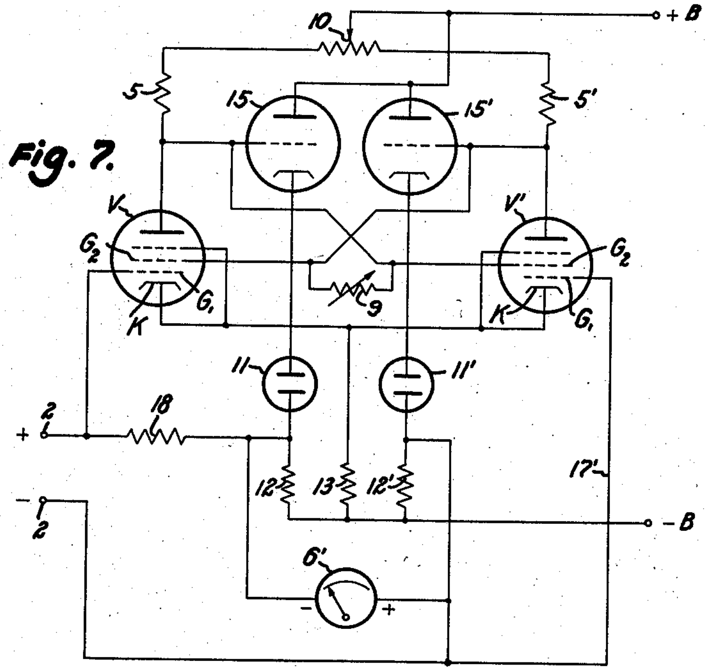
Figure 8:
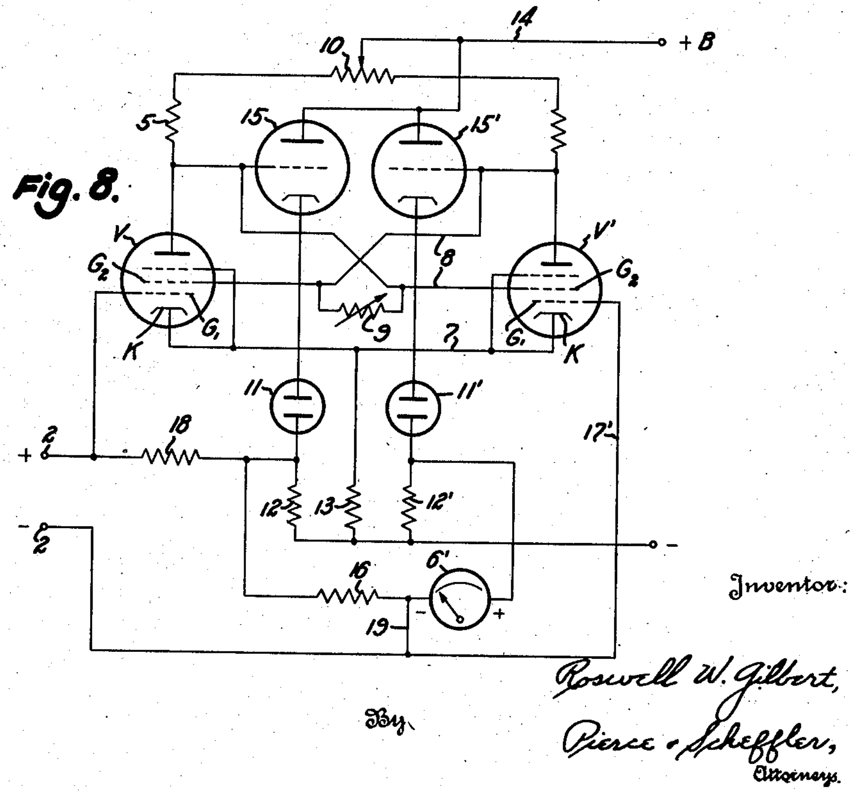

Each of the circuits so far described comprises a voltage input-voltage output amplifier which draws no energy from the input source and which affords unity or greater than unity amplification with stability against zero drift and with a calibration accuracy which is constant over substantial variations in the voltage of the power source or sources for energizing the amplifier. Other embodiments of the invention for effecting different types of amplification, and under the same stable operating characteristics, are illustrated in Figs. 6, 7 and 8. These circuits are generally similar to the voltage input-voltage output circuit of Fig. 5 and such circuit elements as are or may be identical will be identified by the reference numerals of Fig. 5 but will not be specifically described or identified.

The apparatus or circuit of Fig. 6 is an amplifier or converter of the voltage input-current output type which differs from the Fig. 5 circuit in that the millivoltmeter 6 of Fig. 5 is removed and a milliammeter or microammeter 6' is substituted for the resistor 16' of Fig. 5.

In the current input circuits of Figs. 7 and 8, the control grid $G_1$ of the tube V' is connected to the negative input terminal 2 by the lead 17', and the positive input terminal of the regulator tube 11 through a resistor 18. The voltage-measuring instrument 6 is connected across the low potential terminals of the regulator tubes 11, 11' in the current input-voltage output circuit of Fig. 7, and the current-measuring instrument 6' and a series resistor 16 are connected between the low potential terminals of regulator tubes 11, 11' in the current input-current output amplifier of Fig. 8; the junction of the instrument 6' and resistance 16 being connected to the lead 17' by a jumper 19.

It is to be understood that the invention is not limited to the particular circuits herein shown and described as other arrangements for obtaining a plate-follower operation and/or for introducing regeneration in a heavily degenerated amplifier fall within the spirit and scope of the invention as set forth in the following claims.

I claim:

1. An amplifier comprising a pair of vacuum tubes which each have a primary and a secondary control electrode cooperating with a cathode and an anode, conductive circuit elements connecting the secondary control electrode of each tube to the anode of the other tube to provide regeneration, said circuit elements including means for establishing a desired degree of regeneration, means conductively coupling the anode of each tube to its own primary control electrode to provide degeneration, means for impressing an input signal upon the primary control electrodes, and an output circuit conductively coupled to said anodes.

2. An amplifier as recited in claim 1, in combination with additional vacuum tubes imposed between said anodes and said output circuit, said additional vacuum tubes being responsive to potential changes occurring on said anodes.

ROSWELL W. GILBERT.

(References on following page)

REFERENCES CITED

The following references are of record in the file of this patent:

UNITED STATES PATENTS

| Number | Name | Date |
|---|---|---|
| 2,185,367 | Blumlein | Jan. 2, 1940 |
| 2,220,770 | Mayer | Nov. 5, 1940 |
| 2,272,235 | Boucke | Feb. 10, 1942 |
| 2,276,152 | Bull et al. | Mar. 10, 1942 |
| 2,310,342 | Artzt | Feb. 9, 1943 |
| 2,311,807 | Anderson | Feb. 23, 1943 |
| 2,354,718 | Tuttle | Aug. 1, 1944 |

FOREIGN PATENTS

| Number | Country | Date |
|---|---|---|
| 526,869 | Great Britain | Sept. 26, 1940 |